(12) United States Patent
Lewis et al.

(10) Patent No.: US 8,505,963 B1
(45) Date of Patent: Aug. 13, 2013

(54) AIRBAG ASSEMBLIES WITH STRAP CLAMPS

(75) Inventors: Robert Lewis, West Haven, UT (US); Isaac Lewis Hoffman, Kaysville, UT (US); Larry D. Rose, South Weber, UT (US); Matthew Alan Cox, Centerville, UT (US); Kirk Rasmussen, West Point, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/404,285

(22) Filed: Feb. 24, 2012

(51) Int. Cl.
*B60R 21/20* (2011.01)

(52) U.S. Cl.
USPC ........................................ 280/728.2; 280/741

(58) Field of Classification Search
USPC ....................... 280/728.2, 732, 741
See application file for complete search history.

(56) References Cited

U.S. PATENT DOCUMENTS

| | | | |
|---|---|---|---|
| 3,858,822 A | 1/1975 | Wood | |
| 3,904,222 A | 9/1975 | Bursott et al. | |
| 3,966,227 A | 6/1976 | Cameron | |
| 4,290,627 A | 9/1981 | Cumming et al. | |
| 4,915,410 A * | 4/1990 | Bachelder | 280/732 |
| 5,062,664 A * | 11/1991 | Bishop et al. | 280/728.2 |
| 5,074,584 A * | 12/1991 | Jarboe | 280/728.2 |
| 5,092,628 A | 3/1992 | Tamura et al. | |
| 5,338,061 A | 8/1994 | Nelson et al. | |
| 5,344,184 A | 9/1994 | Keeler et al. | |
| 5,398,958 A * | 3/1995 | Taggart | 280/728.2 |
| 5,405,164 A * | 4/1995 | Paxton et al. | 280/728.2 |
| 5,427,410 A | 6/1995 | Shiota et al. | |
| 5,460,400 A | 10/1995 | Davidson | |
| 5,490,690 A | 2/1996 | Mihm | |
| 5,529,337 A | 6/1996 | Takeda et al. | |
| 5,630,621 A | 5/1997 | Schneider | |
| 5,669,627 A | 9/1997 | Marjanski et al. | |
| 5,690,354 A | 11/1997 | Logan et al. | |
| 5,765,867 A | 6/1998 | French | |
| 5,772,239 A | 6/1998 | Seymour | |
| 5,803,487 A | 9/1998 | Kikuchi et al. | |
| 5,810,390 A | 9/1998 | Enders et al. | |
| 5,823,566 A | 10/1998 | Manire | |
| 5,845,935 A | 12/1998 | Enders et al. | |
| 5,927,748 A | 7/1999 | O'Driscoll | |

(Continued)

FOREIGN PATENT DOCUMENTS

| | | |
|---|---|---|
| DE | 20 2006 014 012 | 8/2006 |
| DE | 10 2008 029 810 | 12/2009 |

(Continued)

OTHER PUBLICATIONS

Restriction and/or Election Requirement mailed Jan. 20, 2011 in co-pending U.S. Appl. No. 12/430,562, now issued as U.S. Patent No. 8,083,254.

(Continued)

*Primary Examiner* — Paul N Dickson
*Assistant Examiner* — Nicole Verley
(74) *Attorney, Agent, or Firm* — Stoel Rives LLP

(57) ABSTRACT

Inflatable airbag assemblies having a strap and clamp system to securely hold an inflator relative to a housing. The strap may be attached to an airbag cushion to restrict the movement of the strap or strap may not be attached to the airbag cushion and may move freely while positioned within openings in the housing.

23 Claims, 13 Drawing Sheets

(56) References Cited

U.S. PATENT DOCUMENTS

| | | | |
|---|---|---|---|
| 5,944,342 | A | 8/1999 | White et al. |
| 6,010,147 | A | 1/2000 | Brown |
| 6,059,312 | A | 5/2000 | Staub et al. |
| 6,082,761 | A | 7/2000 | Kato et al. |
| 6,135,495 | A | 10/2000 | Redgrave et al. |
| 6,155,595 | A | 12/2000 | Schultz |
| 6,173,988 | B1 * | 1/2001 | Igawa .......................... 280/728.2 |
| 6,176,511 | B1 * | 1/2001 | Adkisson et al. ............ 280/728.2 |
| 6,213,496 | B1 | 4/2001 | Minami et al. |
| 6,217,059 | B1 | 4/2001 | Brown et al. |
| 6,224,089 | B1 | 5/2001 | Uchiyama et al. |
| 6,224,129 | B1 | 5/2001 | Cisternino et al. |
| 6,254,121 | B1 | 7/2001 | Fowler et al. |
| 6,260,878 | B1 | 7/2001 | Tanase |
| 6,279,944 | B1 | 8/2001 | Wipasuramonton et al. |
| 6,293,581 | B1 | 9/2001 | Saita et al. |
| 6,299,205 | B1 | 10/2001 | Keshavaraj |
| 6,364,341 | B1 * | 4/2002 | Perkins et al. .............. 280/728.2 |
| 6,364,348 | B1 | 4/2002 | Jang et al. |
| 6,431,581 | B1 * | 8/2002 | Wagener et al. ............ 280/728.2 |
| 6,431,583 | B1 | 8/2002 | Schneider |
| 6,447,003 | B1 | 9/2002 | Wallentin et al. |
| 6,450,529 | B1 | 9/2002 | Kalandek et al. |
| 6,454,296 | B1 | 9/2002 | Tesch et al. |
| 6,464,255 | B1 | 10/2002 | Preisler et al. |
| 6,474,686 | B1 | 11/2002 | Higuchi et al. |
| 6,494,484 | B2 | 12/2002 | Bosgieter et al. |
| 6,497,429 | B2 | 12/2002 | Matsumoto |
| 6,588,793 | B2 | 7/2003 | Rose |
| 6,631,920 | B1 | 10/2003 | Webber et al. |
| 6,655,711 | B1 | 12/2003 | Labrie et al. |
| 6,682,093 | B2 | 1/2004 | Tajima et al. |
| 6,685,217 | B2 | 2/2004 | Abe |
| 6,715,789 | B2 | 4/2004 | Takimoto et al. |
| 6,749,216 | B2 | 6/2004 | Tanase et al. |
| 6,752,417 | B2 | 6/2004 | Takimoto et al. |
| 6,783,148 | B2 | 8/2004 | Henderson |
| 6,805,374 | B2 | 10/2004 | Saderholm et al. |
| 6,811,184 | B2 | 11/2004 | Ikeda et al. |
| 6,846,005 | B2 | 1/2005 | Ford et al. |
| 6,860,506 | B2 | 3/2005 | Ogata et al. |
| 6,866,292 | B2 | 3/2005 | Thomas |
| 6,877,765 | B2 | 4/2005 | Rose et al. |
| 6,913,280 | B2 | 7/2005 | Dominissini et al. |
| 6,945,557 | B2 | 9/2005 | Takimoto et al. |
| 6,959,944 | B2 | 11/2005 | Mori et al. |
| 6,962,363 | B2 | 11/2005 | Wang et al. |
| 6,962,366 | B2 | 11/2005 | Fukuda et al. |
| 7,000,945 | B2 | 2/2006 | Bakhsh et al. |
| 7,000,947 | B2 | 2/2006 | Kumagai et al. |
| 7,029,024 | B2 * | 4/2006 | Baumbach ................... 280/728.2 |
| 7,029,026 | B2 | 4/2006 | Morita |
| 7,055,851 | B2 | 6/2006 | Takimoto et al. |
| 7,077,424 | B2 | 7/2006 | Inoue |
| 7,090,243 | B2 | 8/2006 | Igawa |
| 7,090,245 | B2 | 8/2006 | Yoshikawa et al. |
| 7,131,664 | B1 | 11/2006 | Pang et al. |
| 7,140,639 | B2 | 11/2006 | Hayaski et al. |
| 7,147,247 | B2 | 12/2006 | Hayakawa |
| 7,152,876 | B2 | 12/2006 | Hoffmann |
| 7,156,418 | B2 | 1/2007 | Sato et al. |
| 7,175,195 | B2 | 2/2007 | Morita |
| 7,182,365 | B2 | 2/2007 | Takimoto et al. |
| 7,185,912 | B2 | 3/2007 | Matsuura et al. |
| 7,195,275 | B2 | 3/2007 | Abe |
| 7,195,280 | B2 | 3/2007 | Wheelwright et al. |
| 7,201,396 | B2 | 4/2007 | Takimoto et al. |
| 7,213,839 | B2 | 5/2007 | Lockwood |
| 7,226,077 | B2 | 6/2007 | Abe |
| 7,232,149 | B2 | 6/2007 | Hotta et al. |
| 7,243,941 | B2 | 7/2007 | Charpentier et al. |
| 7,261,318 | B2 | 8/2007 | Enders |
| 7,281,734 | B2 | 10/2007 | Abe et al. |
| 7,314,228 | B2 | 1/2008 | Ishiguro et al. |
| 7,314,230 | B2 | 1/2008 | Kumagai et al. |
| 7,347,444 | B2 | 3/2008 | Wheelwright |
| 7,370,881 | B2 | 5/2008 | Takimoto et al. |
| 7,370,884 | B2 * | 5/2008 | Clark et al. .................... 280/740 |
| 7,374,201 | B2 | 5/2008 | Chausset |
| 7,374,202 | B2 | 5/2008 | Lim |
| 7,380,813 | B2 | 6/2008 | Lanzinger et al. |
| 7,384,065 | B2 | 6/2008 | Takimoto et al. |
| 7,387,311 | B2 | 6/2008 | Kanno et al. |
| 7,396,042 | B2 | 7/2008 | Mabuchi et al. |
| 7,396,044 | B2 | 7/2008 | Bauer et al. |
| 7,404,572 | B2 | 7/2008 | Salmo et al. |
| 7,431,327 | B2 * | 10/2008 | Kretzschmar et al. ..... 280/728.2 |
| 7,434,837 | B2 | 10/2008 | Hotta et al. |
| 7,438,310 | B2 | 10/2008 | Takimoto et al. |
| 7,487,994 | B2 | 2/2009 | Okada et al. |
| 7,549,672 | B2 | 6/2009 | Sato et al. |
| 7,566,074 | B2 | 7/2009 | Hawthorn et al. |
| 7,568,724 | B2 | 8/2009 | Kutchey et al. |
| 7,568,730 | B2 | 8/2009 | Kwon |
| 7,631,894 | B2 | 12/2009 | Hasebe et al. |
| 7,641,223 | B2 | 1/2010 | Knowlden |
| 7,658,408 | B2 | 2/2010 | Zofchak et al. |
| 7,658,409 | B2 | 2/2010 | Ford et al. |
| 7,677,595 | B2 | 3/2010 | Dominissini et al. |
| 7,695,013 | B2 | 4/2010 | Kakstis et al. |
| 7,699,340 | B2 | 4/2010 | Okuhara et al. |
| 7,712,769 | B2 | 5/2010 | Hasebe et al. |
| 7,717,460 | B2 | 5/2010 | Franke et al. |
| 7,744,118 | B2 | 6/2010 | Takimoto et al. |
| 7,748,739 | B2 | 7/2010 | Brinker |
| 7,753,405 | B2 | 7/2010 | Ishiguro et al. |
| 7,753,407 | B2 | 7/2010 | Yokota |
| 7,766,374 | B2 | 8/2010 | Abele et al. |
| 7,789,414 | B2 * | 9/2010 | Blackburn ................. 280/728.2 |
| 7,793,973 | B2 | 9/2010 | Sato et al. |
| 7,798,517 | B2 | 9/2010 | Ishida |
| 7,819,419 | B2 | 10/2010 | Hayashi et al. |
| 7,832,693 | B2 * | 11/2010 | Moerke et al. ................... 248/71 |
| 7,878,540 | B2 | 2/2011 | Takimoto et al. |
| 7,883,112 | B2 | 2/2011 | Wold et al. |
| 7,963,549 | B2 | 6/2011 | Schneider et al. |
| 8,007,000 | B2 | 8/2011 | Gammill et al. |
| 8,083,254 | B2 | 12/2011 | Enders et al. |
| 8,118,325 | B2 | 2/2012 | Enders et al. |
| 8,196,952 | B2 | 6/2012 | Walston |
| 8,246,073 | B2 * | 8/2012 | Glockler et al. ............ 280/728.2 |
| 8,272,667 | B2 | 9/2012 | Schneider et al. |
| 8,297,649 | B2 | 10/2012 | Enders |
| 8,297,650 | B2 | 10/2012 | Enders |
| 8,360,464 | B2 | 1/2013 | Enders |
| 2001/0007391 | A1 | 7/2001 | Hamada et al. |
| 2002/0044819 | A1 | 4/2002 | Shamoon |
| 2002/0067030 | A1 * | 6/2002 | Burgess ........................ 280/731 |
| 2002/0149187 | A1 | 10/2002 | Holtz et al. |
| 2002/0171231 | A1 | 11/2002 | Takimoto et al. |
| 2002/0180187 | A1 | 12/2002 | Hayashi |
| 2003/0034637 | A1 | 2/2003 | Wang et al. |
| 2003/0090093 | A1 | 5/2003 | Ikeda et al. |
| 2003/0132615 | A1 | 7/2003 | Henderson |
| 2003/0178832 | A1 * | 9/2003 | Dominissini et al. ....... 280/743.2 |
| 2003/0209888 | A1 | 11/2003 | Davis, Jr. et al. |
| 2004/0150202 | A1 | 8/2004 | Goto |
| 2005/0001412 | A1 | 1/2005 | Schneider et al. |
| 2005/0001415 | A1 | 1/2005 | Charpentier et al. |
| 2005/0057028 | A1 | 3/2005 | Hayakawa |
| 2005/0062265 | A1 | 3/2005 | Hotta et al. |
| 2005/0134022 | A1 | 6/2005 | Noguchi et al. |
| 2005/0151351 | A1 | 7/2005 | Enders et al. |
| 2005/0194767 | A1 | 9/2005 | Freisler et al. |
| 2005/0194771 | A1 | 9/2005 | Clark et al. |
| 2005/0212275 | A1 | 9/2005 | Hasebe |
| 2005/0225060 | A1 * | 10/2005 | Wold ........................ 280/728.2 |
| 2005/0230939 | A1 | 10/2005 | Abe et al. |
| 2005/0242551 | A1 | 11/2005 | Noguchi et al. |
| 2006/0108777 | A1 | 5/2006 | Mabuchi et al. |
| 2006/0108778 | A1 | 5/2006 | Ochiai et al. |
| 2006/0244244 | A1 | 11/2006 | Blackburn |
| 2006/0279073 | A1 | 12/2006 | Hotta et al. |
| 2007/0057487 | A1 | 3/2007 | Kim |

| | | | |
|---|---|---|---|
| 2007/0120346 | A1 | 5/2007 | Kwon |
| 2007/0200321 | A1 | 8/2007 | Heitplatz et al. |
| 2007/0246920 | A1 | 10/2007 | Abele et al. |
| 2007/0267852 | A1 | 11/2007 | Enders |
| 2008/0048418 | A1 | 2/2008 | Remley et al. |
| 2008/0157509 | A1 | 7/2008 | Abe et al. |
| 2008/0217892 | A1 | 9/2008 | Maripudi et al. |
| 2008/0238048 | A1 | 10/2008 | Ishida |
| 2009/0039627 | A1 | 2/2009 | Yokota |
| 2009/0045607 | A1 | 2/2009 | Fukuyama et al. |
| 2009/0058048 | A1 | 3/2009 | Shida et al. |
| 2009/0058052 | A1 | 3/2009 | Ford et al. |
| 2009/0085333 | A1 | 4/2009 | Imaeda et al. |
| 2009/0134607 | A1 | 5/2009 | Okuhara et al. |
| 2009/0134611 | A1 | 5/2009 | Wigger et al. |
| 2009/0146400 | A1 | 6/2009 | Knowlden |
| 2009/0152838 | A1* | 6/2009 | Robins ............... 280/728.2 |
| 2009/0152842 | A1 | 6/2009 | Benny et al. |
| 2009/0152847 | A1 | 6/2009 | Hong et al. |
| 2009/0184498 | A1 | 7/2009 | Takimoto et al. |
| 2009/0212541 | A1 | 8/2009 | Wallat et al. |
| 2009/0242308 | A1 | 10/2009 | Kitte et al. |
| 2010/0025973 | A1 | 2/2010 | Jang et al. |
| 2010/0090445 | A1 | 4/2010 | Williams et al. |
| 2010/0207368 | A1 | 8/2010 | Weyrich |
| 2010/0253055 | A1 | 10/2010 | Schneider et al. |
| 2010/0270775 | A1 | 10/2010 | Enders et al. |
| 2010/0270779 | A1 | 10/2010 | Enders et al. |
| 2010/0270782 | A1 | 10/2010 | Enders et al. |
| 2011/0012327 | A1 | 1/2011 | Enders |
| 2011/0049848 | A1 | 3/2011 | Walston et al. |
| 2011/0095512 | A1 | 4/2011 | Mendez |
| 2011/0101660 | A1 | 5/2011 | Schneider et al. |
| 2011/0148077 | A1* | 6/2011 | Enders ............... 280/728.2 |
| 2011/0163521 | A1* | 7/2011 | Gammill et al. ........ 280/728.2 |
| 2011/0266778 | A1* | 11/2011 | Jakobsson ............. 280/728.2 |
| 2012/0025496 | A1 | 2/2012 | Schneider et al. |
| 2012/0049488 | A1 | 3/2012 | Enders |
| 2012/0049497 | A1 | 3/2012 | Enders |
| 2012/0074673 | A1* | 3/2012 | Henriksson et al. ...... 280/728.2 |
| 2012/0242066 | A1 | 9/2012 | Chavez et al. |
| 2013/0113190 | A1 | 5/2013 | Schneider |

FOREIGN PATENT DOCUMENTS

| | | |
|---|---|---|
| EP | 1508486 | 6/2009 |
| JP | 2005104176 | 4/2005 |
| WO | WO 02/04262 | 1/2002 |
| WO | WO 2010/126623 | 11/2010 |
| WO | WO 2011/008916 | 1/2011 |
| WO | WO 2011/028684 | 3/2011 |
| WO | WO 2011/056810 | 5/2011 |
| WO | WO 2011/079178 | 6/2011 |
| WO | WO 2011/085167 | 7/2011 |
| WO | WO 2012/030482 | 3/2012 |

OTHER PUBLICATIONS

Amendment and Response to Requirement of Election of Species filed Feb. 22, 2011 in co-pending U.S. Appl. No. 12/430,562, now issued as U.S. Patent No. 8,083,254.
Office Action mailed Mar. 30, 2011 in co-pending U.S. Appl. No. 12/430,562, now issued as U.S. Patent No. 8,083,254.
Amendment and Response to Office Action filed Jun. 30, 2011 in co-pending U.S. Appl. No. 12/430,562, now issued as U.S. Patent No. 8,083,254.
Examiner's Interview Summary mailed Jul. 6, 2011 in co-pending U.S. Appl. No. 12/430,562, now issued as U.S. Patent No. 8,083,254.
Notice of Allowance and Fee(s) Due mailed Aug. 23, 2011 in co-pending U.S. Appl. No. 12/430,562, now issued as U.S. Patent No. 8,083,254.
Office Action mailed Jan. 21, 2011 in co-pending U.S. Appl. No. 12/430,274, now issued as U.S. Patent No. 8,118,325.
Amendment and Response to Office Action filed Jul. 21, 2011 in co-pending U.S. Appl. No. 12/430,274, now issued as U.S. Patent No. 8,118,325.
Notice of Allowance and Fee(s) Due mailed Oct. 18, 2011 in co-pending U.S. Appl. No. 12/430,274, now issued as U.S. Patent No. 8,118,325.
Restriction Requirement mailed Sep. 15, 2010 in co-pending U.S. Appl. No. 12/430,246, now published as U.S. Publication No. US 2010/0270782.
Amendment and Response to Requirement for Election of Species filed Oct. 12, 2010 in co-pending U.S. Appl. No. 12/430,246, now published as U.S. Publication No. US 2010/0270782.
Office Action mailed Oct. 29, 2010 in co-pending U.S. Appl. No. 12/430,246, now published as U.S. Publication No. US 2010/0270782.
Amendment and Response to Office Action filed Apr. 28, 2011 in co-pending U.S. Appl. No. 12/430,246, now published as U.S. Publication No. US 2010/0270782.
Final Office Action mailed Jun. 24, 2011 in co-pending U.S. Appl. No. 12/430,246, now published as U.S. Publication No. US 2010/0270782.
Office Action issued Sep. 15, 2010 in co-pending U.S. Appl. No. 12/417,357, now issued as U.S. Patent No. 7,963,549.
Amendment and Response to Office Action filed Mar. 15, 2011 in co-pending U.S. Appl. No. 12/417,357, now issued as U.S. Patent No. 7,963,549.
Notice of Allowance and Fee(s) Due mailed Apr. 18, 2011 in co-pending U.S. Appl. No. 12/417,357, now issued as U.S. Patent No. 7,963,549.
Restriction Requirement mailed Jan. 20, 2012 in co-pending U.S. Appl. No. 12/645,130, now published as U.S. Publication No. US 2011/0148077.
Amendment and Response to Restriction Requirement filed Jun. 20, 2012 in co-pending U.S. Appl. No. 12/645,130, now published as U.S. Publication No. US 2011/0148077.
Office Action mailed Jul. 19, 2012 in co-pending U.S. Appl. No. 12/645,130, now published as U.S. Publication No. US 2011/0148077.
Applicant-Initiated Interview Summary mailed Dec. 18, 2012 in co-pending U.S. Appl. No. 12/645,130, now published as U.S. Publication No. US 2011/0148077.
Amendment and Response filed Dec. 19, 2012 in co-pending U.S. Appl. No. 12/645,130, now published as U.S. Publication No. US 2011/0148077.
Notice of Allowance and Fee(s) Due mailed Apr. 10, 2013 in co-pending U.S. Appl. No. 12/645,130, now published as U.S. Publication No. US 2011/0148077.
Preliminary Amendment filed Aug. 31, 2009 in co-pending U.S. Appl. No. 12/504,544, now issued as U.S. Patent No. 8,297,649.
Preliminary Amendment filed Jul. 15, 2010 in co-pending U.S. Appl. No. 12/504,544, now issued as U.S. Patent No. 8,297,649.
Office Action mailed Dec. 13, 2010 in co-pending U.S. Appl. No. 12/504,544, now issued as U.S. Patent No. 8,297,649.
Amendment and Response to Office Action filed Jun. 13, 2011 in co-pending U.S. Appl. No. 12/504,544, now issued as U.S. Patent No. 8,297,649.
Final Office Action mailed Jun. 29, 2011 in co-pending U.S. Appl. No. 12/504,544, now issued as U.S. Patent No. 8,297,649.
Examiner's Interview Summary mailed Jul. 7, 2011 in co-pending U.S. Appl. No. 12/504,544, now issued as U.S. Patent No. 8,297,649.
Amendment and Response After Final filed Aug. 29, 2011 in co-pending U.S. Appl. No. 12/504,544, now issued as U.S. Patent No. 8,297,649.
Advisory Action mailed Sep. 9, 2011 in co-pending U.S. Appl. No. 12/504,544, now issued as U.S. Patent No. 8,297,649.
Request for Continued Examination filed Oct. 6, 2011 in co-pending U.S. Appl. No. 12/504,544, now issued as U.S. Patent No. 8,297,649.
Office Action mailed Dec. 1, 2011 in co-pending U.S. Appl. No. 12/504,544, now issued as U.S. Patent No. 8,297,649.
Amendment and Response to Office Action filed May 29, 2012 in co-pending U.S. Appl. No. 12/504,544, now issued as U.S. Patent No. 8,297,649.
Notice of Allowance and Fee(s) Due mailed Jun. 28, 2012 in co-pending U.S. Appl. No. 12/504,544, now issued as U.S. Patent No. 8,297,649.
Restriction Requirement mailed Dec. 27, 2010 in co-pending U.S. Appl. No. 12/522,878, now issued as U.S. Patent No. 8,196,952.

Amendment and Response to Requirement of Election of Species filed Jan. 27, 2011 in co-pending U.S. Appl. No. 12/552,878, now issued as U.S. Patent No. 8,196,952.
Office Action mailed Feb. 28, 2011 in co-pending U.S. Appl. No. 12/552,878, now issued as U.S. Patent No. 8,196,952.
Amendment and Response to Office Action filed Aug. 20, 2011 in co-pending U.S. Appl. No. 12/552,878, now issued as U.S. Patent No. 8,196,952.
Applicant-Initiated Interview Summary mailed Sep. 15, 2011 in co-pending U.S. Appl. No. 12/552,878, now issued as U.S. Patent No. 8,196,952.
Supplemental Amendment filed Oct. 17, 2011 in co-pending U.S. Appl. No. 12/552,878, now issued as U.S. Patent No. 8,196,952.
Final Office Action mailed Nov. 8, 2011 in co-pending U.S. Appl. No. 12/552,878, now issued as U.S. Patent No. 8,196,952.
Amendment and Response to Final Office Action filed Feb. 9, 2012 in co-pending U.S. Appl. No. 12/552,878, now issued as U.S. Patent No. 8,196,952.
Notice of Allowance and Fee(s) Due mailed Feb. 27, 2013 in co-pending U.S. Appl. No. 12/552,878, now issued as U.S. Patent No. 8,196,952.
Restriction Requirement mailed Dec. 14, 2011 in co-pending U.S. Appl. No. 12/611,676, now issued as U.S. Patent No. 8,272,667.
Amendment and Response to Restriction Requirement filed Jan. 17, 2012 in co-pending U.S. Appl. No. 12/611,676, now issued as U.S. Patent No. 8,272,667.
Non-Final Office Action mailed Mar. 8, 2012 in co-pending U.S. Appl. No. 12/611,676, now issued as U.S. Patent No. 8,272,667.
Amendment and Response to Office Action filed Jun. 8, 2012 in co-pending U.S. Appl. No. 12/611,676, now issued as U.S. Patent No. 8,272,667.
Notice of Allowance and Fee(s) Due mailed Jun. 19, 2012 in co-pending U.S. Appl. No. 12/611,676, now issued as U.S. Patent No. 8,272,667.
Office Action mailed Oct. 28, 2010 in co-pending U.S. Appl. No. 12/683,911, now issued as U.S. Patent No. 8,007,000.
Amendment and Response filed Apr. 28, 2011 in co-pending U.S. Appl. No. 12/683,911, now issued as U.S. Patent No. 8,007,000.
Notice of Allowance mailed Jul. 13, 2011 in co-pending U.S. Appl. No. 12/683,911, now issued as U.S. Patent No. 8,007,000.
Non-Final Office Action mailed Mar. 12, 2012 in co-pending U.S. Appl. No. 12/872,323, now issued as U.S. Patent No. 8,360,464.
Amendment and Response to Office Action filed Sep. 12, 2012 in co-pending U.S. Appl. No. 12/872,323, now issued as U.S. Patent No. 8,360,464.
Notice of Allowance and Fee(s) Due mailed Oct. 4, 2012 in co-pending U.S. Appl. No. 12/872,323, now issued as U.S. Patent No. 8,360,464.
Restriction Requirement mailed Oct. 27, 2011 in co-pending U.S. Appl. No. 12/872,946, now issued as U.S. Patent No. 8,297,650.
Amendment and Response to Requirement of Election of Species filed Nov. 28, 2011 in co-pending U.S. Appl. No. 12/872,946, now issued as U.S. Patent No. 8,297,650.
Office Action mailed Dec. 14, 2011 in co-pending U.S. Appl. No. 12/872,946, now issued as U.S. Patent No. 8,297,650.
Amendment and Response to Office Action filed Jun. 14, 2012 in co-pending U.S. Appl. No. 12/872,946, now issued as U.S. Patent No. 8,297,650.
Notice of Allowance and Fee(s) Due mailed Jun. 28, 2012 in co-pending U.S. Appl. No. 12/872,946, now issued as U.S. Patent No. 8,297,650.
Office Action mailed Nov. 6, 2012 in co-pending U.S. Appl. No. 13/270,462, now published as U.S. Publication No. US 2012/0025496.
Amendment and Response to Office Action filed Apr. 4, 2013 in co-pending U.S. Appl. No. 13/270,462, now published as U.S. Publication No. US 2012/0025496.
Office Action mailed Mar. 20, 2013 in co-pending U.S. Appl. No. 13/290,856, now published as U.S. Publication No. US 2013/0113190.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Feb. 18, 2011 in International Application No. PCT/US2010/061744.
Notification of Transmittal of the International Search Report and the Written Opinion of the International Searching Authority mailed Sep. 23, 2010 in International Application No. PCT/US2010/042070.
Notification of Transmittal of the International Search Report and the Written Opinion of the International Searching Authority issued Oct. 28, 2010 in International Application No. PCT/US2010/047250.
Notification of Transmittal of the International Search Report and the Written Opinion of the International Searching Authority mailed Jan. 3, 2011 in International Application No. PCT/US2010/055197.
Notification of Transmittal of the International Search Report and the Written Opinion of the International Searching Authority issued Feb. 1, 2011 in International Application No. PCT/US2011/020469.
Notification of Transmittal of the International Search Report and the Written Opinion of the International Searching Authority mailed Jan. 26, 2012 in International Application No. PCT/US2011/046952.
Notification of Transmittal of the International Search Report and the Written Opinion of the International Searching Authority mailed Jan. 4, 2013 in International Application No. PCT/US2012/058873.

* cited by examiner

AIRBAG ASSEMBLIES WITH STRAP CLAMPS

TECHNICAL FIELD

The present disclosure relates generally to the field of automotive protective systems. More specifically, the present disclosure relates to inflatable airbags having strap clamps. The present disclosure also relates to methods of attaching an inflator to a housing.

BRIEF DESCRIPTION OF THE DRAWINGS

The present embodiments will become more fully apparent from the following description and appended claims, taken in conjunction with the accompanying drawings, which may not be to scale. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other type of airbag.

Inflatable airbags are installed in an undeployed state, in which the inflatable airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration. Thus, an airbag mounting apparatus typically allows for a secure connection between the vehicle and the airbag, yet allows the airbag to change configurations from the packaged configuration to the deployed configuration.

Three embodiments of strap clamps are identified at 190a-b, 290b and 390a-b, respectively in FIGS. 1-5B, FIGS. 6-7C and FIGS. 8-9B. The complete assemblies are shown at 100, 200 and 300. In addition to the strap clamps, the other components of the assemblies include an airbag, a housing, and inflator and strap clamps to attach the inflator to the housing. The strap clamps are used to attach the inflator to the housing. Note that similar features are identified with like numerals, increased by 100.

Figure 1:
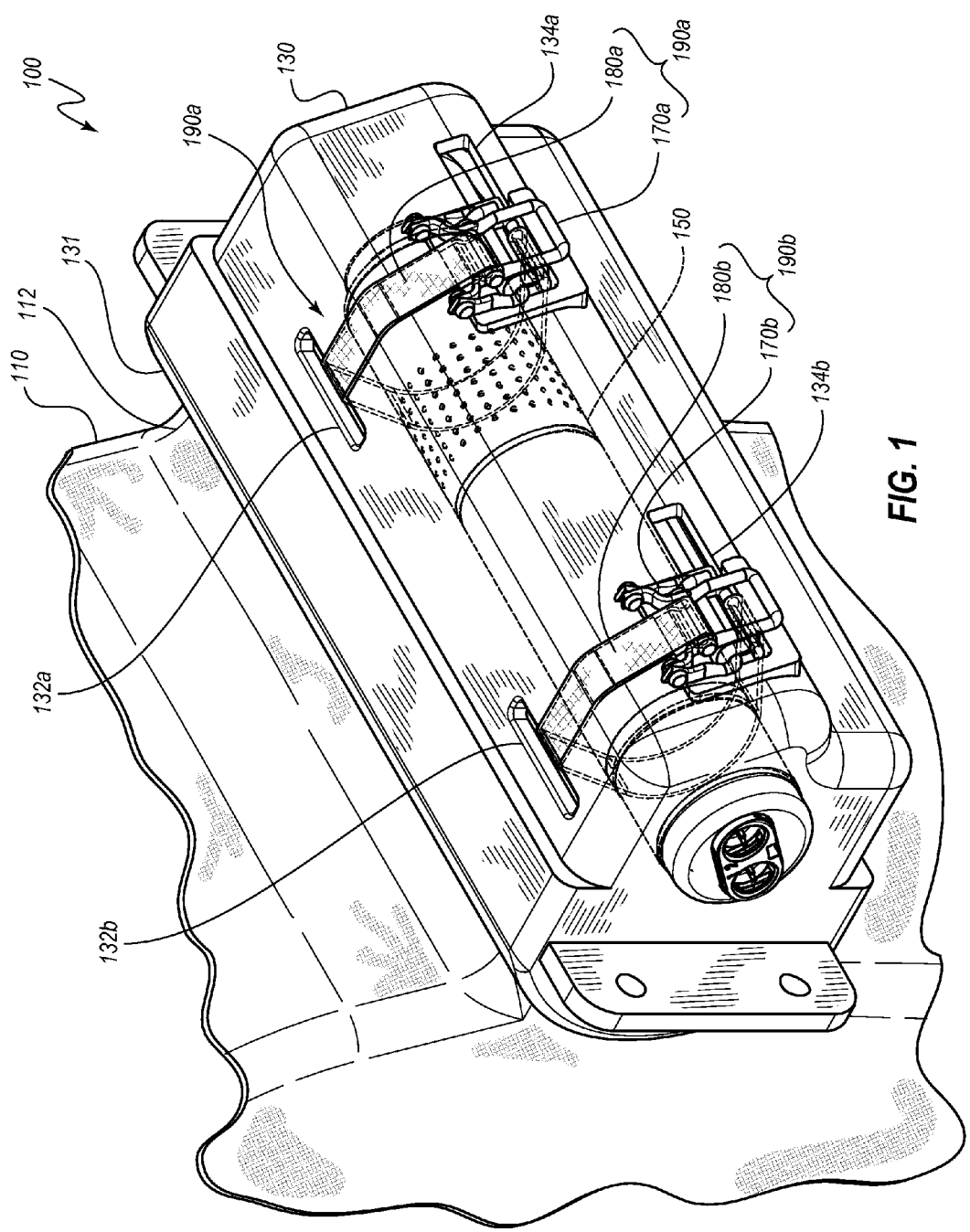
FIG. 1 is a perspective view of one embodiment of an airbag assembly, wherein the airbag assembly comprises an airbag, a housing, an inflator and strap clamps to attach the inflator to the housing.
Figure 2:
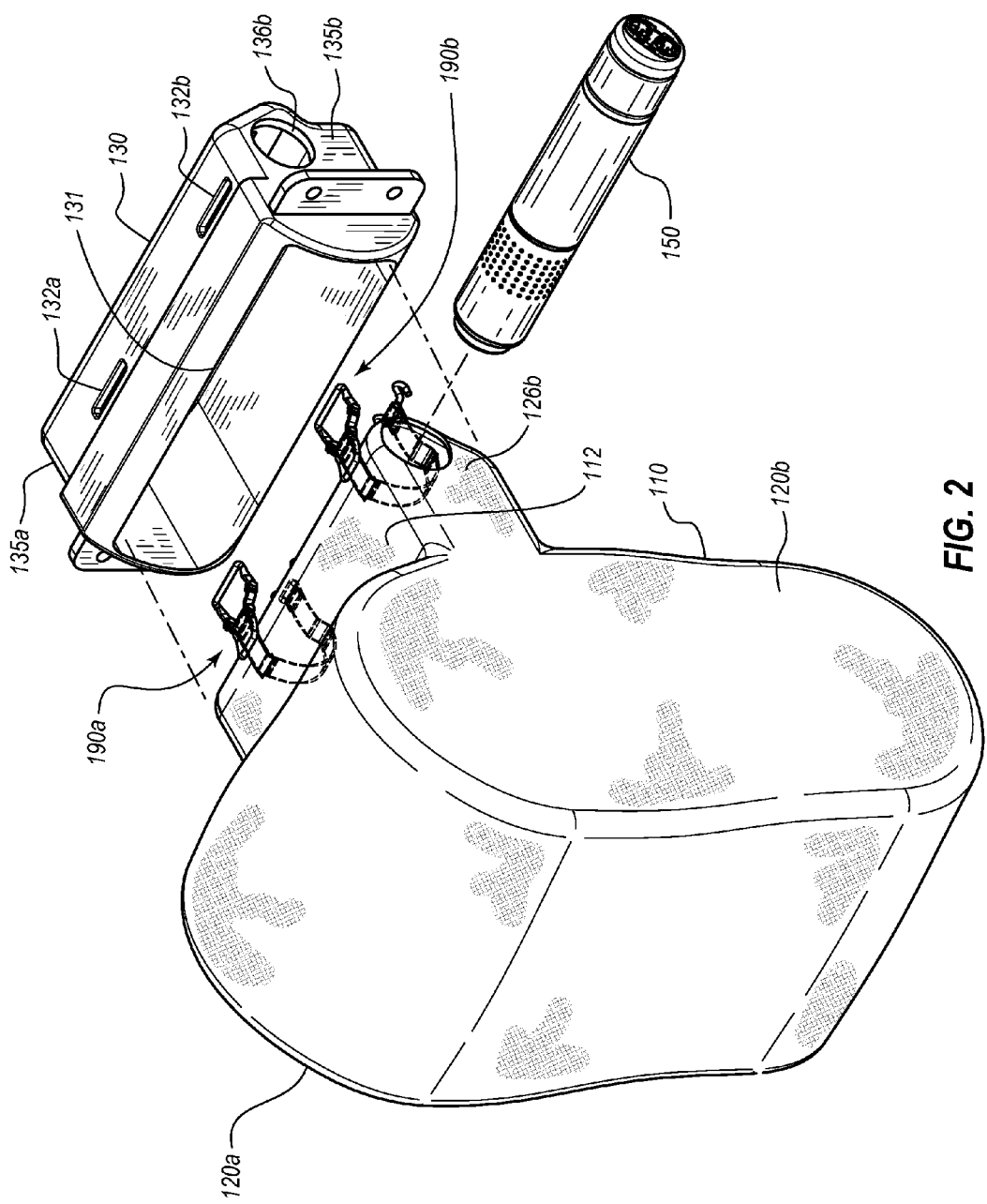
FIG. 2 is an exploded perspective view of the airbag assembly of FIG. 1.

FIG. 1 provides a perspective view of airbag assembly 100 comprising an airbag 110, a housing 130, an inflator 150, and strap clamps 190a-b, which attach housing 130 to inflator 150. These same components are shown in FIG. 2 in an exploded perspective view. Housing 130 can be formed from any material used with a conventional housing such as plastic or metal.

Housing 130 comprises a closed end opposite from an open end, which has a perimeter that defines a primary opening 131. Airbag 110 has a neck 112 that is positioned within housing 130 via primary opening 131.

Figure 3:
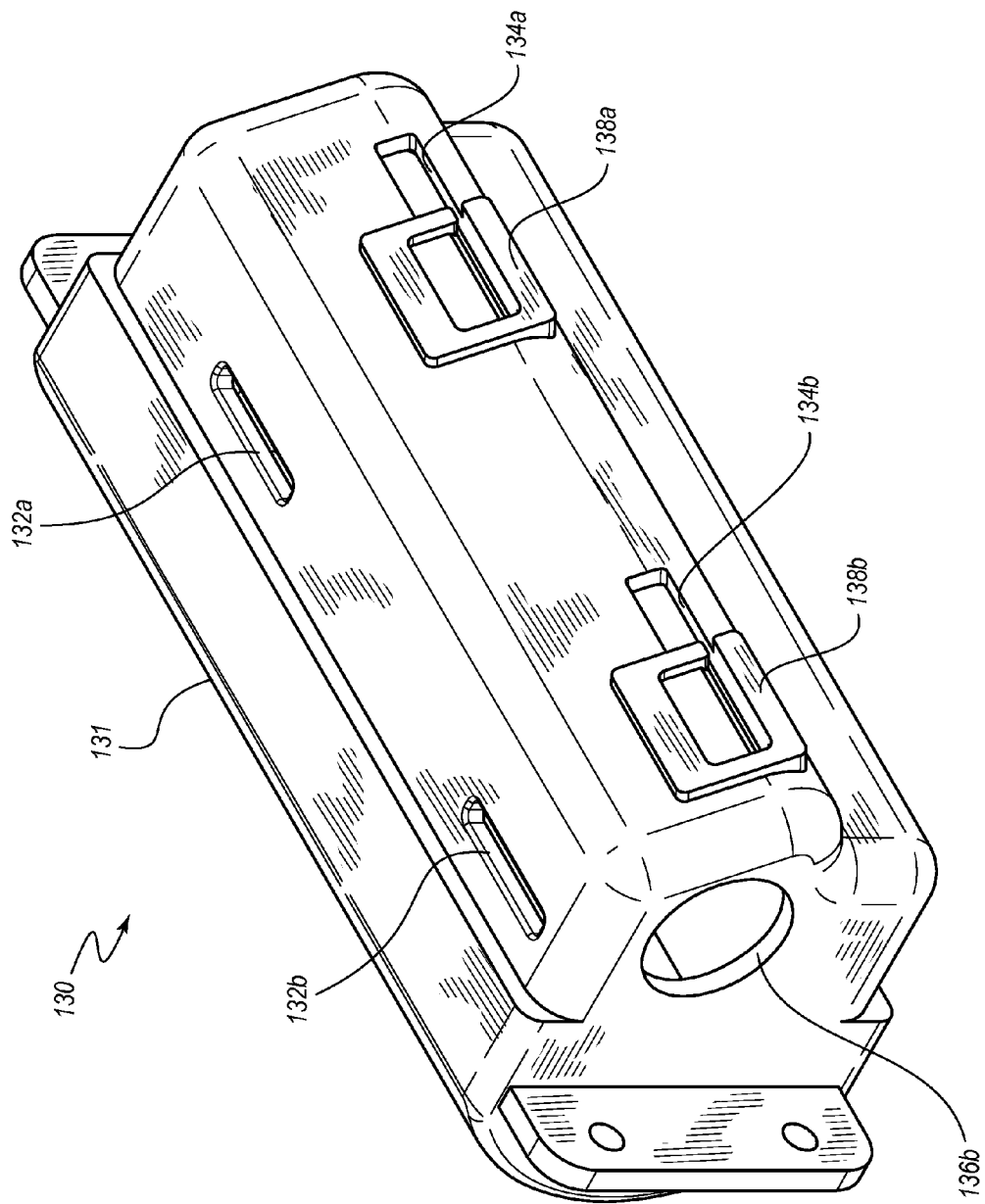
FIG. 3 is a perspective view of the back of the housing shown in FIGS. 1-2.

As shown in FIG. 1, strap clamps 190a-b each respectively comprise a clamp 170a-b and a strap 180a-b. FIG. 1 shows straps 180a-b extending from 132a-b openings in the top of housing 130 to clamps 170a-b that in a closed position. Clamps 170a-b are positioned in recesses 138a-b in housing 130 that are best seen in FIG. 3, which depicts the back of housing 130 without clamps 170a-b. Recesses 138a-b are sized to respectively receive clamps 170a-b, which are described below in more detail with reference to FIGS. 4-5B. Recesses 138a-b are designed to be deep enough to prevent clamps 170a-b from being accidentally opened. Other embodiments may not feature recesses and may enable the clamps to sit on a flat surface of a housing.

Figure 4:
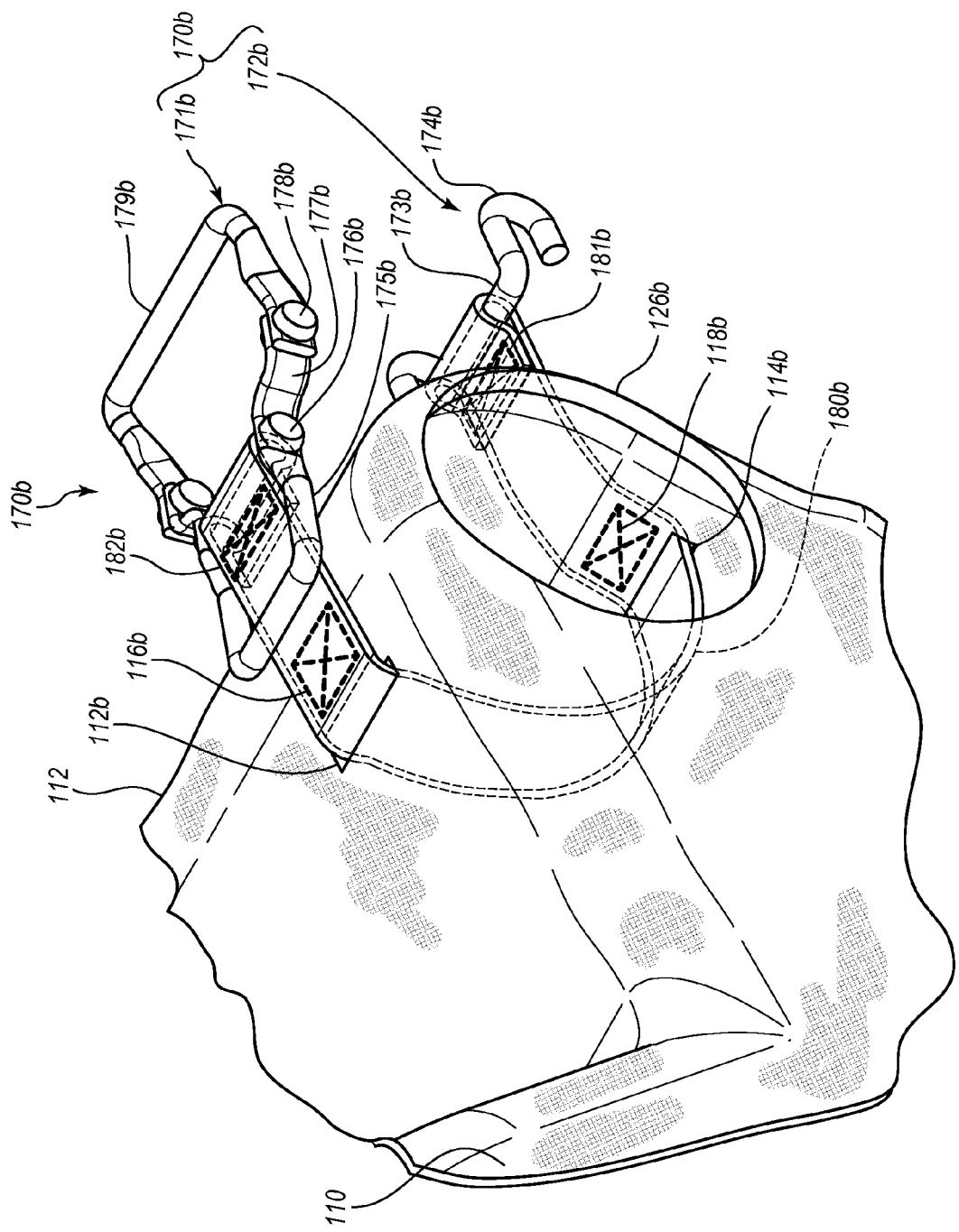
FIG. 4 is a perspective view of a strap clamp as it positioned during assembly ready to receive an inflator.

The detailed view in FIG. 4 shows more features of strap clamp 190b and its interaction with airbag 110. Strap clamp 190b comprises a clamp 170b and a strap 180b. Strap 180b extends through openings 112b and 114b of airbag 110 and through openings 132b and 134b of housing 130. Airbag 110 is also attached to strap 180b of strap clamp 190b via stitching 116b and stitching 118b. Alternatively, the strap may be attached to the airbag at only one location. Because a strap is coupled to the neck of an airbag via stitching in at least one location, movement of each strap relative to the airbag is restricted.

The flat configuration of straps 180a-b provides good surface contact with inflator 150. However, in addition to flat straps such as straps 180a-b, other configurations can also be used, such as a round strap or a strap with several round strands that are wound together. The straps may be formed from materials conventionally used for tethers and cords in airbags such as carbon fibers, metal, or plastic webbing materials such as nylon. Such materials are selected that are sufficiently flexible to wrap around an inflator and conform to the contours of the perimeter of the inflator. Because straps 180a-b have a flat configuration, openings 112a-b, 114a-b, 132a-b, and 134a-b have a slot-like configuration. Stated otherwise, each opening has a longitudinal axis that is at least essentially parallel with a longitudinal axis of inflator 150.

Airbag 110 has a first side 120a opposite from a second side 120b. Housing 130 has a first side 135a opposite from a second side 135b. With reference to FIG. 2 and FIG. 4, assembly 100 is manufactured by inserting inflator 150 via opening 136b in second end 135b of housing 130 and opening 126b in second end 120b of airbag 110 into the interior of housing 130 and the interior of airbag 110. First side 120a and first side 135a may be configured like their opposing sides with an opening 136a (not shown) and an opening 126a (not shown). Alternatively, first side 120a and first side 135a may be configured without openings such that they are closed.

Each strap clamp has a bracket at one end opposite from a latch at the other end that cooperate together as a clamp to secure the inflator in a relatively fixed or fixed position relative to the housing. FIG. 4 depicts strap clamp 190b, which is configured the same as strap clamp 190a. Strap clamp 190b comprises a clamp 170b and a strap 180b. Clamp 170b comprises a bracket 171b and a latch 172b. Latch 172b comprises a straight section 173b that transitions to a hook section 174b. Latch 172b is secured to strap 180 via stitching 181b. Bracket 171b comprises a first U-shaped component 175b. Strap 180b is coupled to bracket 171b via pin 176b. Coupler 177b couples first U-shaped component 175b to second U-shaped component 179 via pins 178b.

Figure 5A:
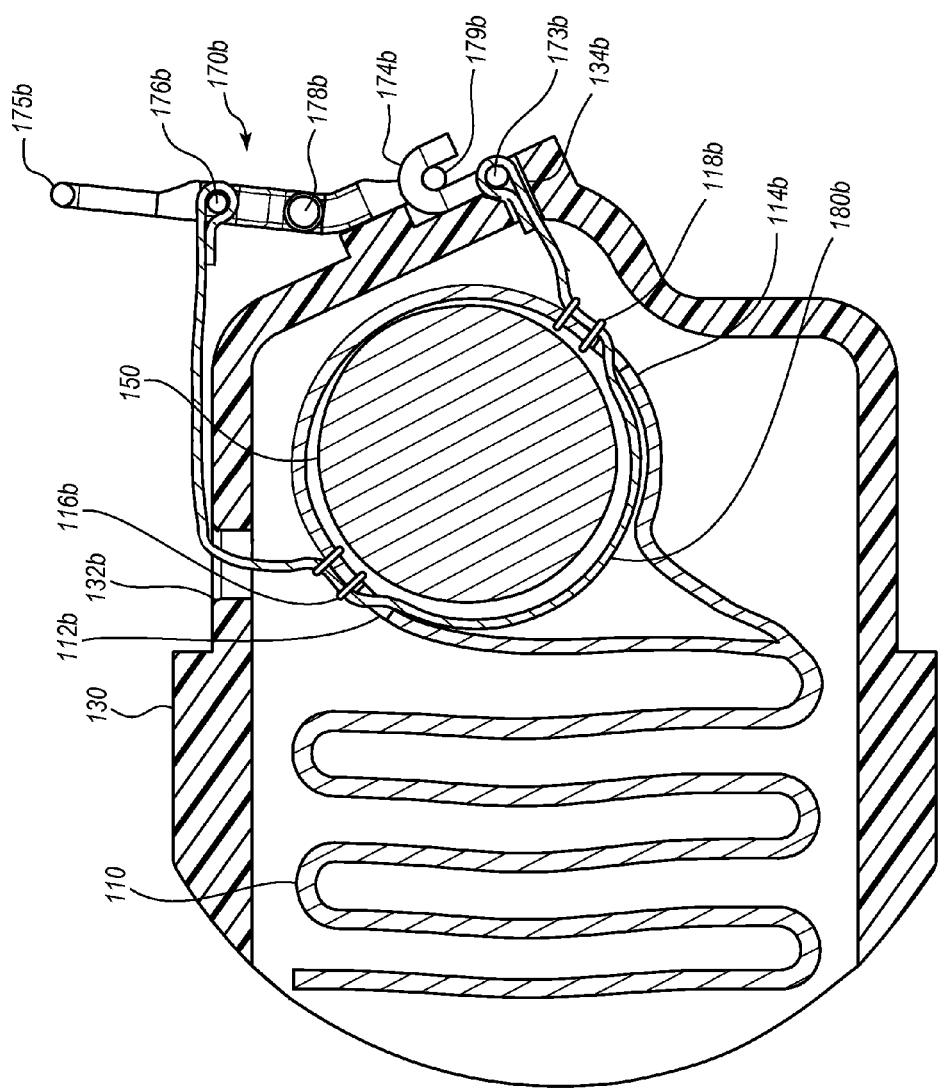
FIG. 5A is a cross-sectional view of the airbag, housing, inflator and a strap clamp that is engaged, open and ready to be closed to attach the inflator to the housing.
Figure 5B:
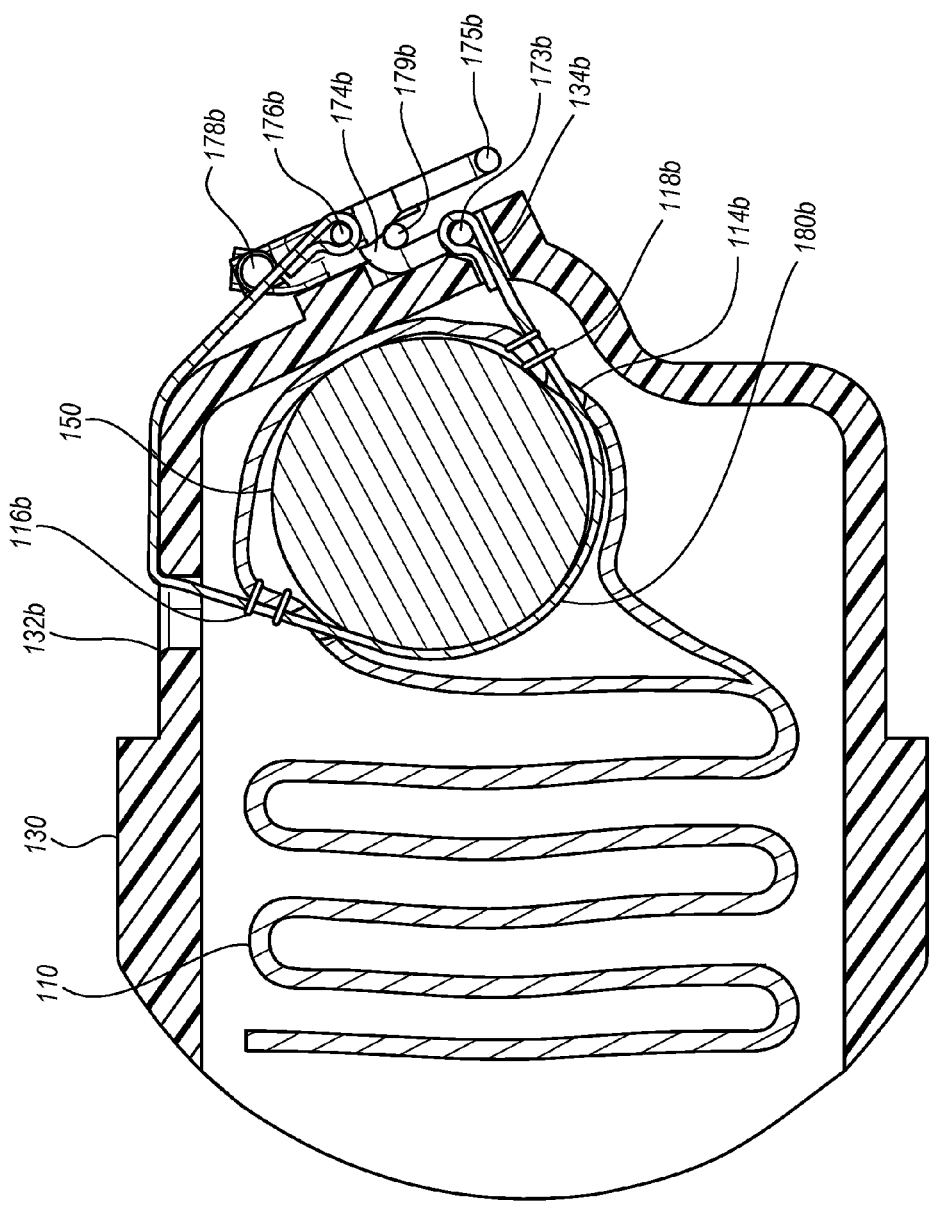
FIG. 5B is a cross-sectional view of the airbag, housing, inflator and strap clamp shown in FIG. 5A wherein the clamp is closed and locked to attach the inflator to the housing.

FIGS. 5A-5B are cross-sectional views of the airbag 110, housing 130, inflator 150 and strap clamp 190b. In FIG. 5A, clamp 170b is in an engaged position and is ready to be moved to the closed position to attach inflator 150 to housing 130. More particularly, a straight section of second U-shaped component 179b is positioned within hook section 174b of latch 172b so that when first U-shaped component 175b pivots about pins 178b, strap 180b is tightened against inflator 150.

FIG. 5B shows strap clamp 190b after it has been moved to the closed position to securely hold inflator 150 with respect to housing 130. Strap 180b extends around a portion of the perimeter of inflator 150 and is depicted securely holding inflator 150 against housing 130 as strap 180b is taut against inflator 150. More particularly, strap 180b contacts inflator 150 around approximately half of the perimeter of inflator 150. FIG. 5B shows strap 180b having a length that is selected so that when clamp 190b is in the closed position, strap 180b urges the inflator against a rear surface of the interior of housing 130. Note that the rear surface of the interior of housing 130 forms an obtuse angle with an upper surface of the interior of housing 130 that could alternatively be used to cooperate with the taut strap, with adjusted locations for openings 132b and 134b, to more securely hold the inflator 150. However, it is not necessary for inflator to be urged against a surface of the interior of housing 130 to securely hold inflator as it is also sufficient for strap 180b to be merely taut based on its length and the position of openings 132b and 134b.

Figure 6:
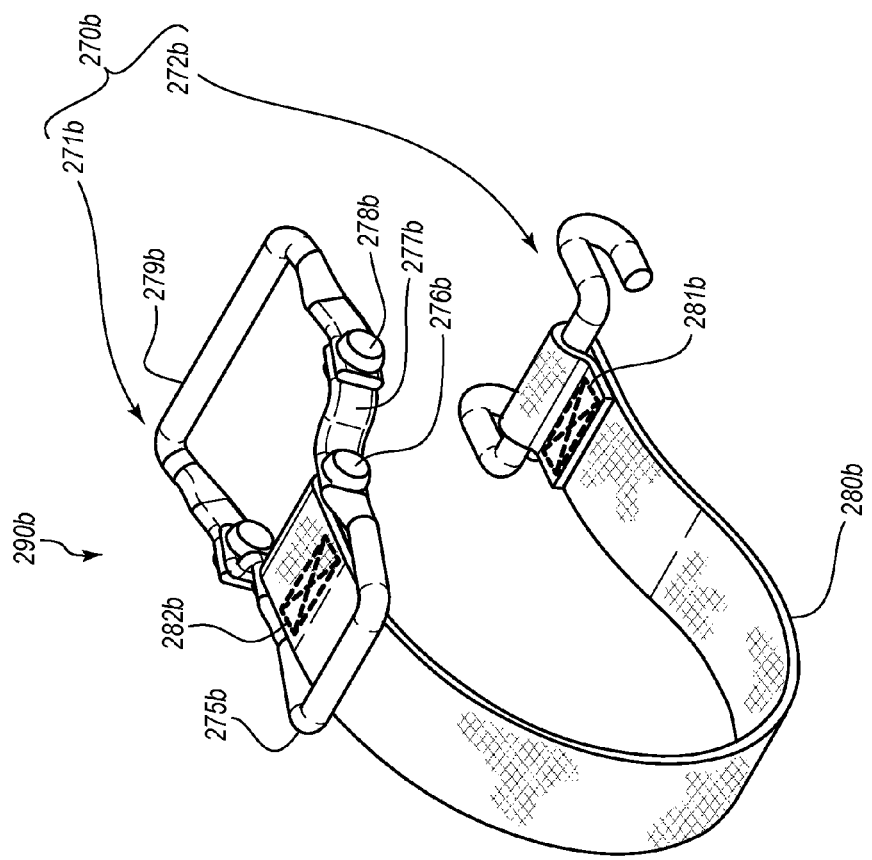
FIG. 6 is a perspective view of another embodiment of a strap clamp wherein the strap is configured for attachment with another embodiment of an airbag.
Figure 7A:
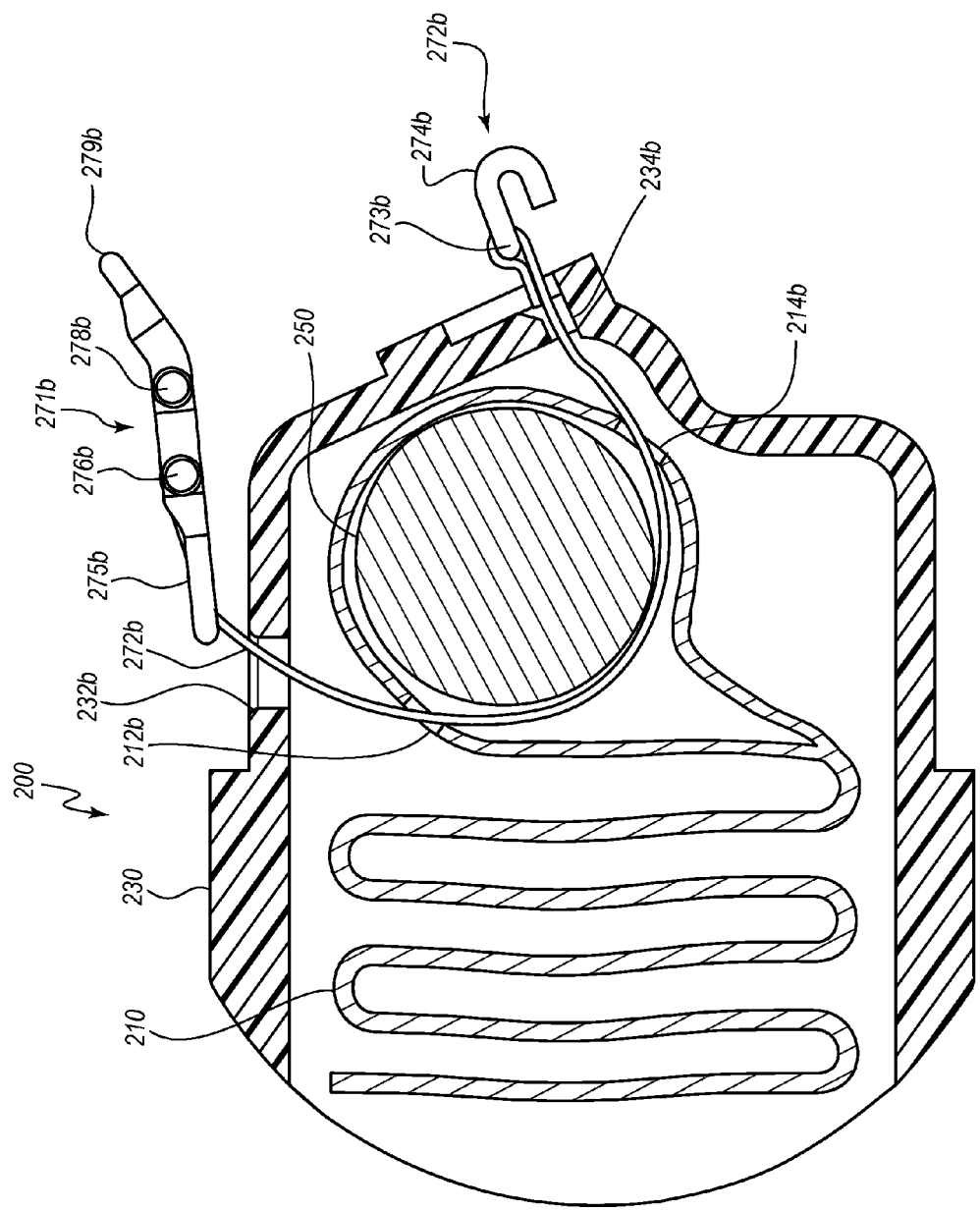
FIG. 7A is a cross-sectional view of the strap clamp shown in FIG. 6 that is attached to another embodiment of an airbag. The housing and inflator are the same as those shown in FIGS. 1-5B. The clamp is not yet engaged.
Figure 7B:
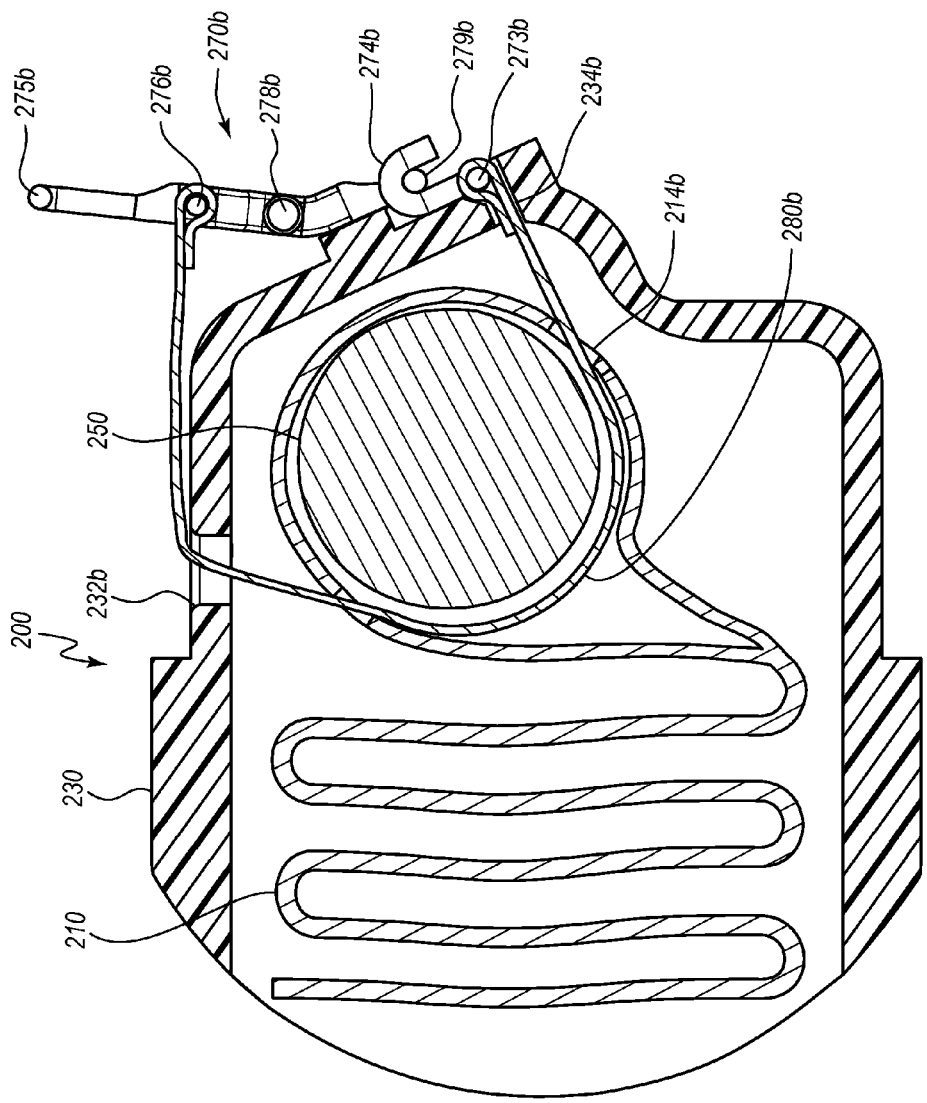
FIG. 7B is a cross-sectional view of the assembly shown in FIG. 7A with the clamp engaged, open and ready to be closed to attach the inflator to the housing.

FIG. 6 depicts a strap clamp 290b that is identical to strap clamp 190b, however, as shown in FIGS. 7A-7B, strap 280b is not sewn to airbag 210. Accordingly, strap 280b can 212 move through openings 212b and 214b without being restricted by stitches. Straps 280b also moves through openings 232b and 234b of housing 230.

FIG. 7A only shows strap clamp 290b of assembly 200 and the other strap clamp 290a, which is identical to strap clamp 290b, is not shown. Strap clamp 290b interacts with airbag, inflator and the housing in the same manner as strap clamp 290a. FIG. 7A shows strap clamp 290b in an earlier manufacturing step than the manufacturing step shown of strap clamp 190b in FIG. 4A. As discussed above, FIG. 5A shows bracket 171b engaged with latch 172b. FIG. 7A shows bracket 271b before becoming engaged with latch 272b.

FIG. 7B shows that airbag 210 differs from airbag 110 by permitting strap 280b to freely move relative to airbag 210 via openings 212b and 214b. This configuration permits adjustments to be made with respect to the positions of the airbag, strap clamps, inflator and the housing. More particularly, this configuration permits adjustments to be made to positions of the airbag or the inflator relative to the housing.

Figure 7C:
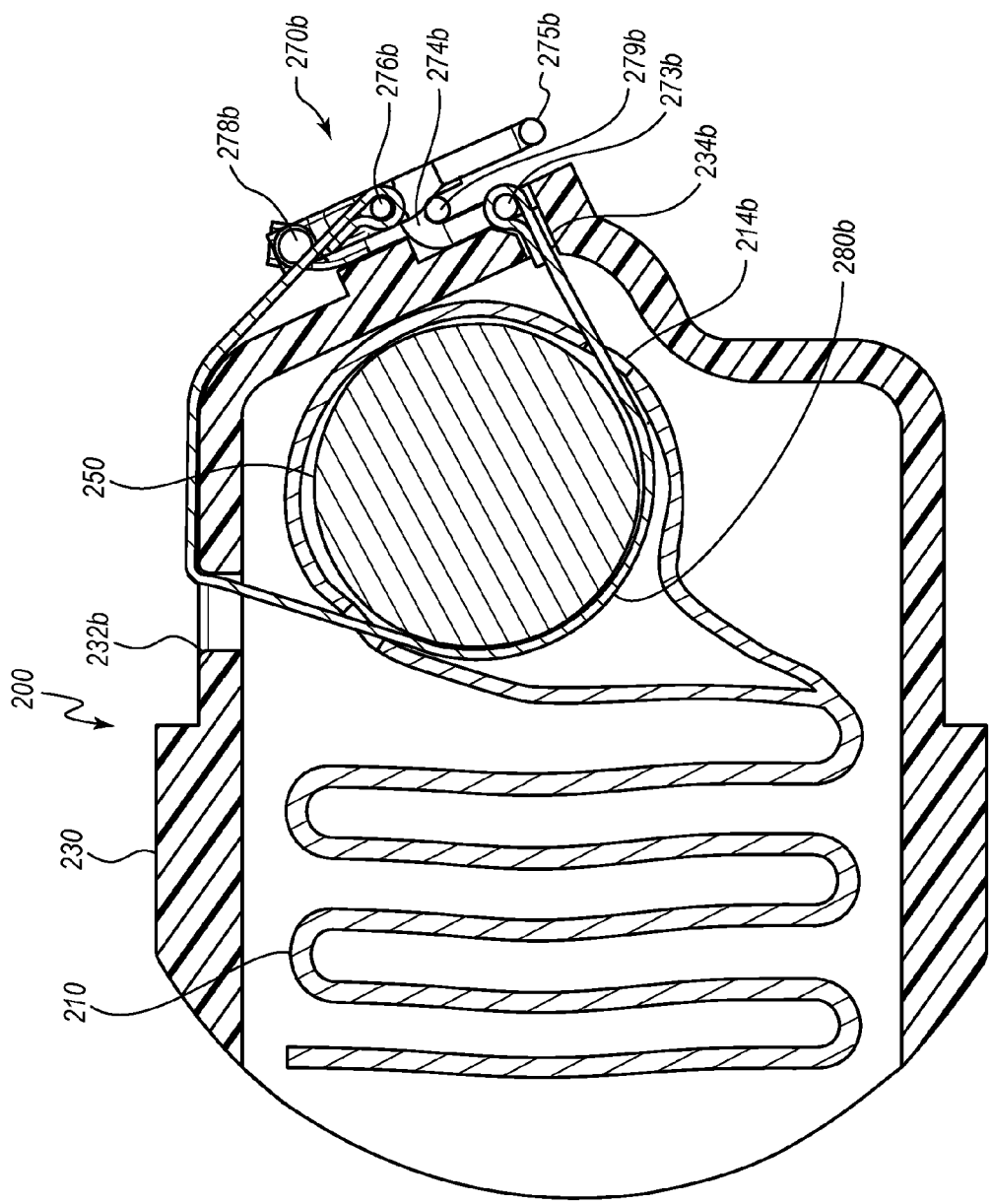
FIG. 7C is a cross-sectional view of the assembly shown in FIGS. 7A-7B wherein the clamp is closed and locked to attach the inflator to the housing.

Once clamp 270b is closed and locked as shown in FIG. 7C, it becomes more difficult for adjustments to be made with respect to the positions of the airbag, strap clamps, inflator and the housing as compared with the engaged position depicted in FIG. 7B. Like assembly 100, strap 280b of assembly 200 partially circumscribes inflator 250 and is depicted securely holding inflator 250 against housing 230. Of course, the firmness of the interaction between the inflator and the housing in each embodiment depends primarily on the length of the strap.

Figure 8:
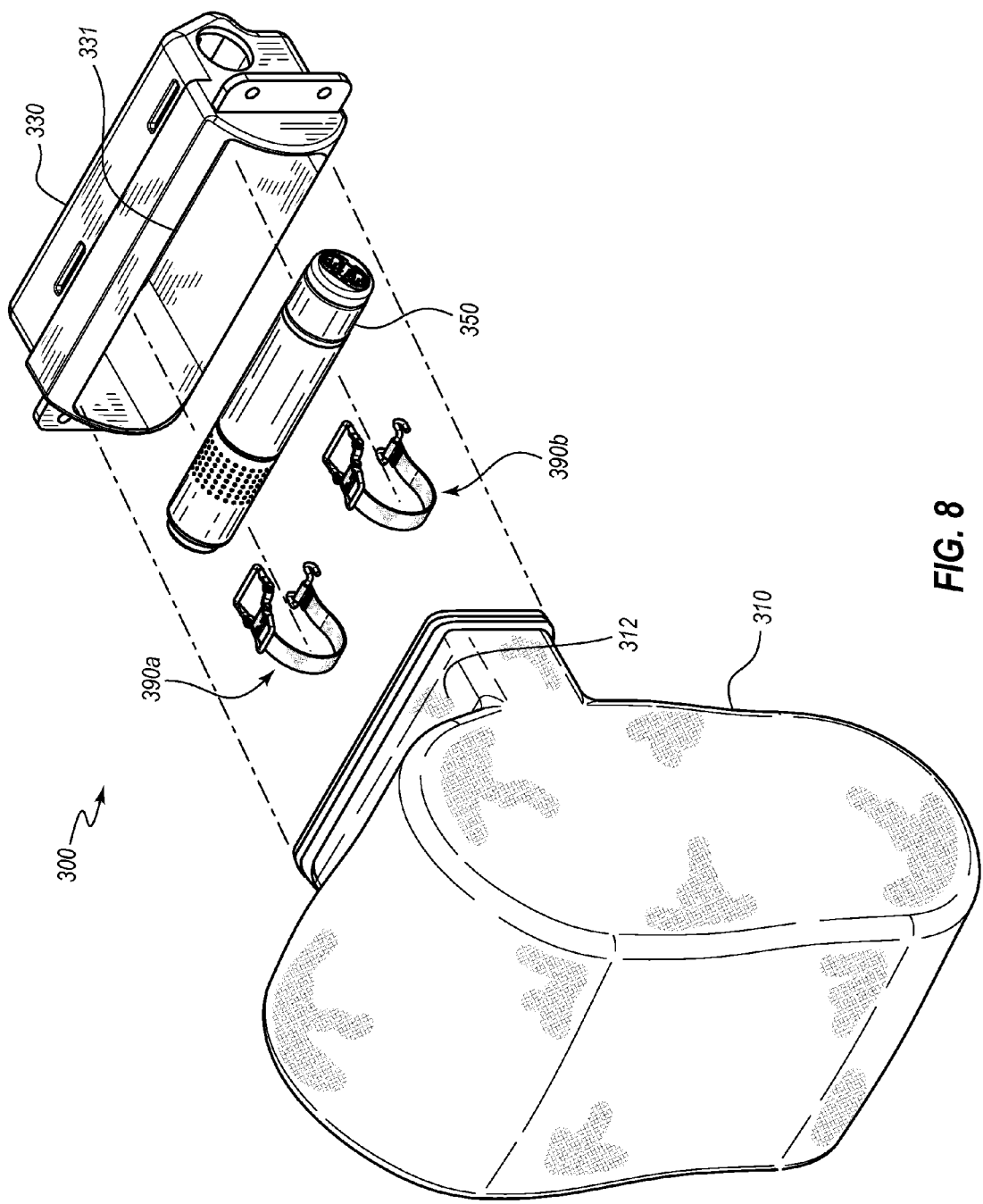
FIG. 8 is an exploded perspective view of another embodiment of the airbag assembly.

FIG. 8 provides an exploded perspective view of another embodiment of the airbag assembly. Like the other embodiments, assembly 300 is configured so that strap clamps 390a-b hold inflator 350 within housing 330. However, unlike the other embodiments, airbag 310 of assembly 300 is not connected to inflator 350.

Figure 9A:
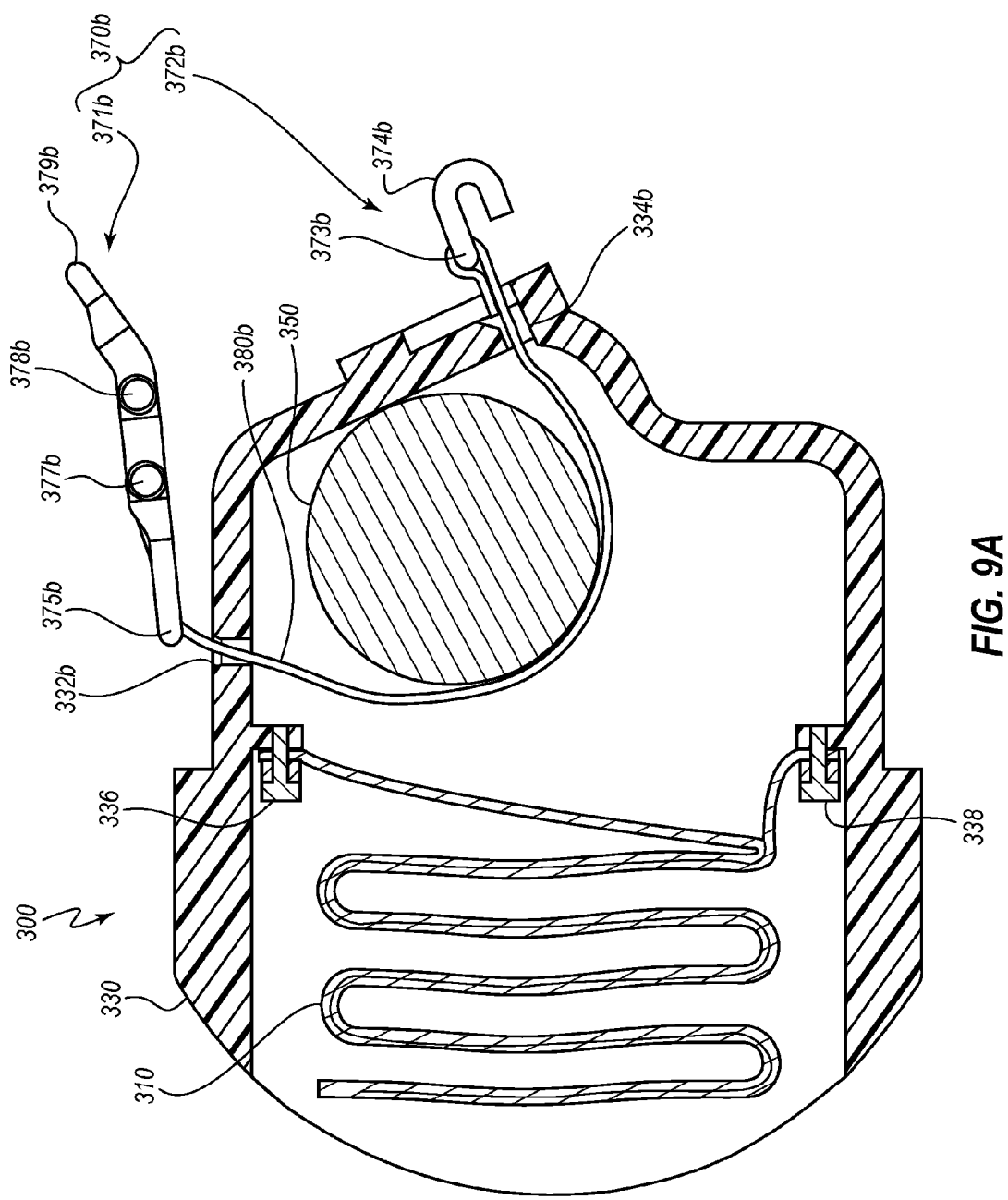
FIG. 9A is a cross-sectional view of the strap clamp shown in FIG. 8 with the clamp unengaged and unattached to the embodiment of the airbag as the airbag is attached to the housing. Like the other embodiments, the strap partially circumscribes the inflator.
Figure 9B:
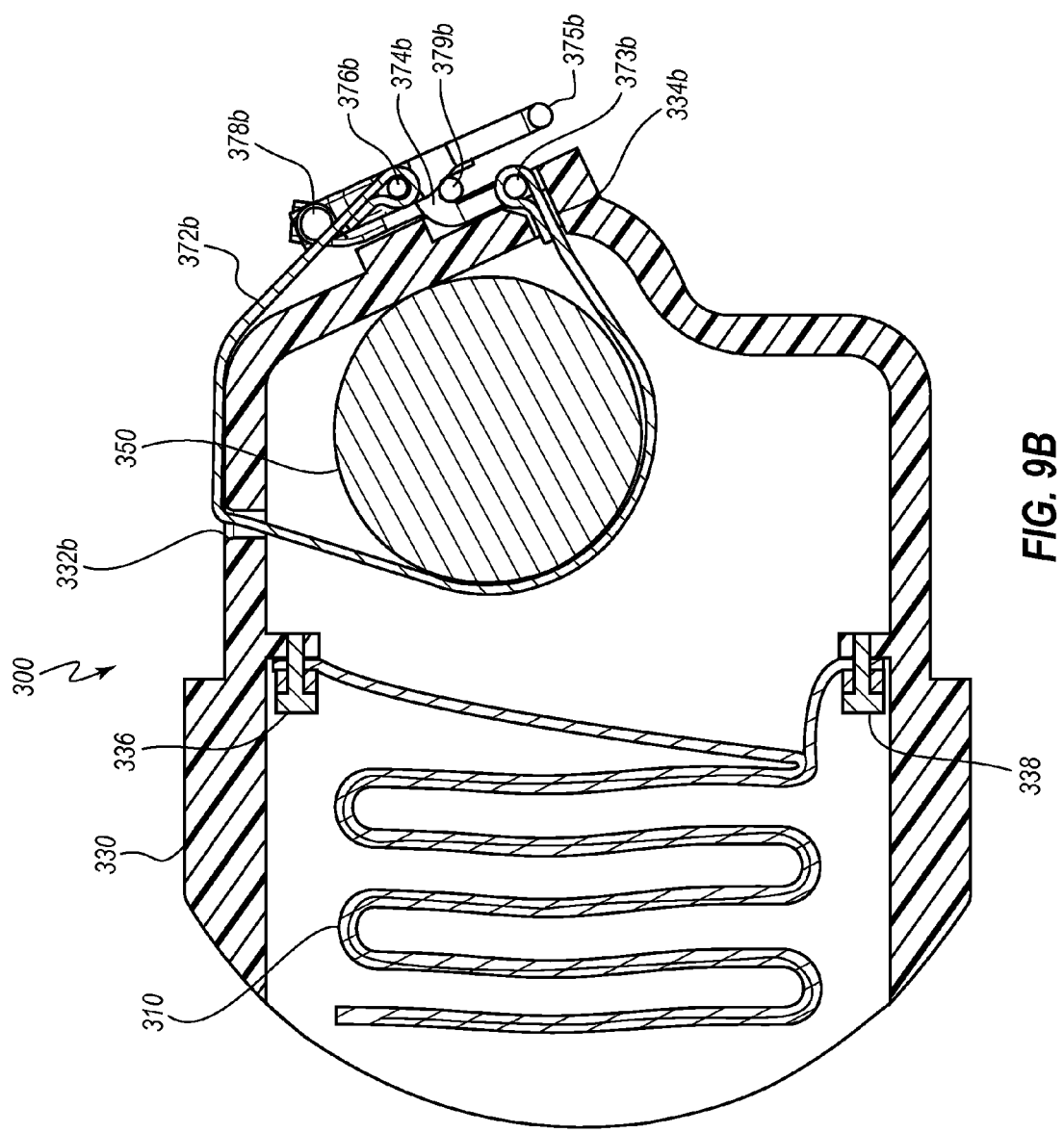
FIG. 9B is a cross-sectional view of the assembly shown in FIGS. 8-9A wherein the clamp is closed and locked to attach the inflator to the housing.

FIGS. 9A-9B show that airbag 310 is connected to housing 330 by couplers 336 and 338. Like the cross-sectional view of the strap clamp shown in FIG. 6A with the clamp unengaged and unattached, FIG. 8A provides a cross-sectional view of airbag assembly 300 with clamp 370b unengaged and unattached. Like the cross-sectional views of the strap clamp shown in FIG. 5B and FIG. 7C, FIG. 9B provides a cross-sectional view of airbag assembly 300 with clamp 370b closed and locked. Clamp 370b operates in exactly the same manner as clamps 170a-b and clamps 270a-b.

Strap 380b extends partially around the perimeter of inflator 350 like the other embodiments. Strap 380b extends through openings 332b and 334b of housing 330. However, as mentioned above, strap 380b does not retain airbag 310. Accordingly, movement of each strap within the respective pair of strap openings permits adjustments to be made to positions of inflator 350 relative to housing 330.

As will be appreciated by those skilled in the art, a variety of types and configurations of airbag assemblies can be utilized without departing from the scope and spirit of the present disclosure. For example, the size, shape, and proportions of the airbag may vary according to its use in different vehicles or different locations within a vehicle such that the airbag may comprise an inflatable curtain cushion; a rear passenger airbag; a driver's airbag; and/or a front passenger airbag. Also, the cushion membrane may comprise one or more of any material well known in the art, such as a woven nylon fabric. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques. Stitching 116a-b and 118 a-b, welding, adhesives are each examples of a connecting feature used to connect a strap with an airbag.

All of the assemblies 100, 200 and 300 couple an inflator to a housing. These depicted embodiments also achieve the coupling without other structures on the inflator that are conventionally used such as threaded bolts like those shown in FIGS. 19A-19C of U.S. Pat. No. 8,083,254. Accordingly some embodiments have inflators that are devoid of attachment features that extend from the inflator and through the airbag.

The depicted embodiments also attach an inflator to a housing that provides inflation gas to an airbag so that the airbag can deploy perpendicularly with respect to the longitudinal axis of the inflator. Additionally, the housing has a longitudinal axis that is perpendicular with the general deployment direction of the airbag out of the housing.

Airbag assembly 100 may be considered to comprise one or more modular components. A modular component may be defined as a component that is coupled to an inflatable airbag, but is not contiguous with the fabric from which the airbag is formed. A modular component may also be considered to be a sub-assembly of an airbag assembly, wherein the component is coupled to the inflatable airbag after the airbag has been manufactured; however, some components may be coupled to the airbag during airbag manufacture. A modular component may be manufactured before or after the inflatable airbag is manufactured. A modular component need not be suitable for use with more than one type of inflatable airbag or species of airbag. For example, a modular component may have a predetermined length that is intended for use in a specific vehicle make and model and with a predetermined airbag design, such that the component may not be suitable for use in a different vehicle make and model or with a different inflatable airbag. The modular component may be located at or coupled to a periphery of the airbag, such that the component may be called a "peripheral component" or a "peripheral modular component". Further, the modular component may be called a "feature," "attachable feature," or "separate feature". Straps 180, 280 and 380 can be considered modular components of an inflatable airbag assembly. One skilled in the art will recognize that a variety of configurations of straps and clamps may be used without departing from the spirit of the present disclosure. Each pairs of straps is representative of a plurality of straps. Similarly, each pair of strap openings is representative of a plurality of strap openings.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   a housing comprising a plurality of strap openings, a closed end and an open end having a perimeter that defines a primary opening;
   an inflatable airbag having a neck positioned within the primary opening of the housing,
   an inflator positioned within the housing;
   a plurality of strap clamps, wherein each strap clamp comprises a strap and a clamp, each strap extending through one of the pluralities of strap openings such that each strap extends around a portion of the perimeter of the inflator,
   wherein, when each clamp is in a closed position, each strap is taut to securely hold the inflator in the housing.

2. The inflatable airbag assembly of claim 1, wherein each strap opening has a longitudinal axis that is at least essentially parallel with a longitudinal axis of the inflator, wherein each strap has a flat configuration.

3. The inflatable airbag assembly of claim 1, wherein each strap contacts the inflator around approximately half of the perimeter of the inflator.

4. The inflatable airbag assembly of claim 1, wherein each clamp comprises a bracket and a latch that are at opposite ends of the respective strap, wherein the bracket and the latch cooperate together such that each clamp can transition from an engaged position to the closed position.

5. The inflatable airbag assembly of claim 1, wherein the strap has a length that is selected so that when the clamp is in the closed position, the strap urges the inflator against a surface of the interior of the housing.

6. The inflatable airbag assembly of claim 1, wherein the inflator is devoid of an attachment feature that extends from the inflator and through the airbag.

7. The inflatable airbag assembly of claim 1, wherein the housing has a longitudinal axis that is perpendicular with a deployment direction of the airbag out of the housing.

8. An inflatable airbag assembly, comprising:
a housing comprising a first plurality of strap openings, a second a plurality of strap openings, a closed end and an open end having a perimeter that defines a primary opening;
an inflatable airbag having a neck positioned within the primary opening of the housing, wherein a first plurality of strap openings and a second plurality of strap openings are each formed in the neck of the airbag;
an inflator positioned within the housing;
a first strap clamp and a second strap clamp, wherein each strap clamp comprises a strap and a clamp,
wherein the strap of the first strap clamp extends through the first plurality of strap openings of the housing and the first plurality of strap openings of the neck of the airbag,
wherein the strap of the second strap clamp extends through the second plurality of strap openings of the housing and the second plurality of strap openings of the neck of the airbag,
wherein each strap extends around a portion of the perimeter of the inflator,
wherein each clamp can be moved from an engaged position to a closed position so that each strap is taut to securely hold the inflator in the housing.

9. The inflatable airbag assembly of claim 8, wherein each strap opening has a longitudinal axis that is at least essentially parallel with a longitudinal axis of the inflator, wherein each strap has a flat configuration.

10. The inflatable airbag assembly of claim 8, wherein each strap contacts the inflator around approximately half of the perimeter of the inflator.

11. The inflatable airbag assembly of claim 8, wherein each clamp comprises a bracket and a latch that are at opposite ends of the respective strap, wherein the bracket and the latch cooperate together such that each clamp can transition from the engaged position to the closed position.

12. The inflatable airbag assembly of claim 8, wherein the strap has a length that is selected so that when the clamp is in the closed position, the strap urges the inflator against a surface of the interior of the housing.

13. The inflatable airbag assembly of claim 8, wherein each strap is coupled to the neck of the airbag via stitching in at least one location to restrict movement of each strap relative to the airbag.

14. The inflatable airbag assembly of claim 8,
wherein the strap of the first strap clamp can move within the first plurality of strap openings of the housing and the first plurality of strap openings of the neck of the airbag,
wherein the strap of the second strap clamp can move within the second plurality of strap openings of the housing and the second plurality of strap openings of the neck of the airbag,
whereby adjustments can be made to positions of the airbag or the inflator relative to the housing.

15. The inflatable airbag assembly of claim 8, wherein the inflator is devoid of an attachment feature that extends from the inflator and through the airbag.

16. The inflatable airbag assembly of claim 8, wherein the housing has a longitudinal axis that is perpendicular with a deployment direction of the airbag out of the housing.

17. An inflatable airbag assembly, comprising:
a housing comprising a first plurality of strap openings, a second plurality of strap openings, a closed end and an open end having a perimeter that defines a primary opening;
an inflatable airbag having a neck positioned within the primary opening of the housing and coupled to the housing,
an inflator positioned within the housing;
a first plurality of strap clamps and a second plurality of strap clamps, wherein each strap clamp comprises a strap and a clamp,
wherein the strap of the first strap clamp extends through the first plurality of strap openings of the housing and can move within the first plurality of strap openings of the housing,
wherein the strap of the second strap clamp extends through the second plurality of strap openings of the housing and can move within the second plurality of strap openings of the housing,
wherein each strap extends around a portion of the perimeter of the inflator,
wherein movement of each strap within the respective plurality of strap openings permits adjustments to be made to positions of the inflator relative to the housing, and
wherein each clamp can be moved from an engaged position to a closed position so that each strap is taut to securely hold the inflator in the housing.

18. The inflatable airbag assembly of claim 17, wherein each strap opening has a longitudinal axis that is at least essentially parallel with a longitudinal axis of the inflator, wherein each strap has a flat configuration.

19. The inflatable airbag assembly of claim 17, wherein each strap contacts the inflator around approximately half of the perimeter of the inflator.

20. The inflatable airbag assembly of claim 17, wherein each clamp comprises a bracket and a latch that are at opposite ends of the respective strap, wherein the bracket and the latch cooperate together such that each clamp can transition from the engaged position to the closed position.

21. The inflatable airbag assembly of claim 17, wherein the strap has a length that is selected so that when the clamp is in the closed position, the strap urges the inflator against a surface of the interior of the housing.

22. The inflatable airbag assembly of claim 17, wherein the inflator is devoid of an attachment feature that extends from the inflator and through the airbag.

23. The inflatable airbag assembly of claim 17, wherein the housing has a longitudinal axis that is perpendicular with a deployment direction of the airbag out of the housing.

* * * * *